United States Patent [19]

Asano

[11] 4,344,400
[45] Aug. 17, 1982

[54] CONTROL DEVICE FOR AN INTERNAL COMBUSTION ENGINE

[75] Inventor: Masaharu Asano, Yokosuka, Japan

[73] Assignee: Nissan Motor Co., Ltd., Yokohama, Japan

[21] Appl. No.: 173,756

[22] Filed: Jul. 30, 1980

[30] Foreign Application Priority Data

Jul. 31, 1979 [JP] Japan .................................. 54-97939

[51] Int. Cl.³ ........................... F02D 5/04; F02P 5/04; F02M 7/00
[52] U.S. Cl. .................................. 123/425; 123/435; 123/440
[58] Field of Search ............... 123/435, 419, 422, 423, 123/425, 440; 73/35

[56] References Cited

U.S. PATENT DOCUMENTS

| 3,749,070 | 7/1973 | Oishi et al. ........................... 123/422 |
| 3,935,845 | 2/1976 | Asano et al. ......................... 123/422 |
| 4,002,155 | 1/1977 | Harned et al. . |
| 4,133,475 | 1/1979 | Harned et al. ...................... 123/425 |
| 4,153,020 | 5/1979 | King et al. . |
| 4,232,642 | 11/1980 | Yamaguchi et al. ................ 123/422 |
| 4,240,389 | 12/1980 | Shimazaki .......................... 123/440 |
| 4,241,710 | 12/1980 | Peterson, Jr. et al. ............. 123/440 |
| 4,257,364 | 3/1981 | Sawada et al. ..................... 123/425 |
| 4,271,799 | 6/1981 | Kato et al. .......................... 123/425 |
| 4,278,060 | 7/1981 | Isobe et al. ......................... 123/440 |

FOREIGN PATENT DOCUMENTS

| 2731841 | 2/1979 | Fed. Rep. of Germany . |
| 2744742 | 4/1979 | Fed. Rep. of Germany ...... 123/422 |
| 54-120331 | 8/1979 | Japan .................................. 123/422 |
| 2021690 | 12/1979 | United Kingdom . |

Primary Examiner—Raymond A. Nelli
Attorney, Agent, or Firm—Schwartz, Jeffery, Schwaab, Mack, Blumenthal & Koch

[57] ABSTRACT

A control device for an internal combustion engine comprising a knocking detecting means and an operating and controlling means which generates a feedback control signal in response to a knocking detection signal from the knocking detecting means and which feedback controls ignition timing, etc. so as to maintain the firing condition of the engine in optimum condition. The control device further comprises an acceleration detector, the output signal of which controls the knocking detecting means or the operating and controlling means in such a manner that said feedback control signal is amplified to a greater extent in the accelerating condition than in the normal condition, as a result of which the ignition timing, etc. is feedback controlled more quickly in the accelerating condition than in the normal condition, so that the firing condition is maintained in optimum condition even in the accelerating condition.

9 Claims, 8 Drawing Figures

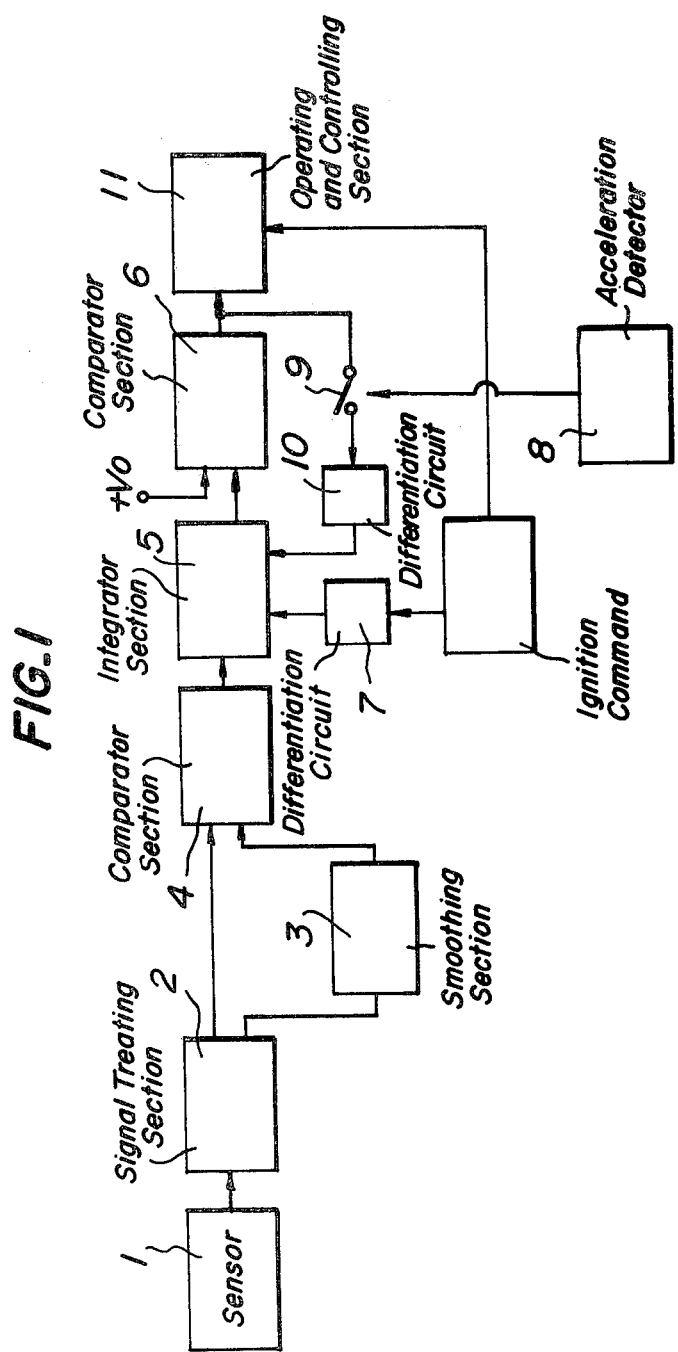

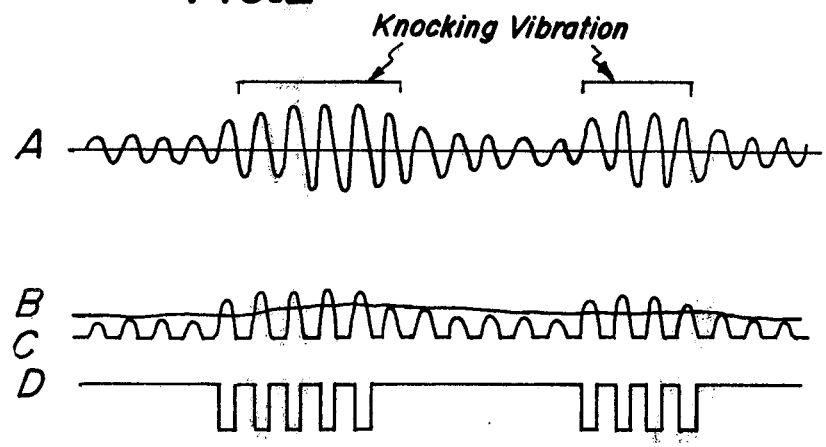
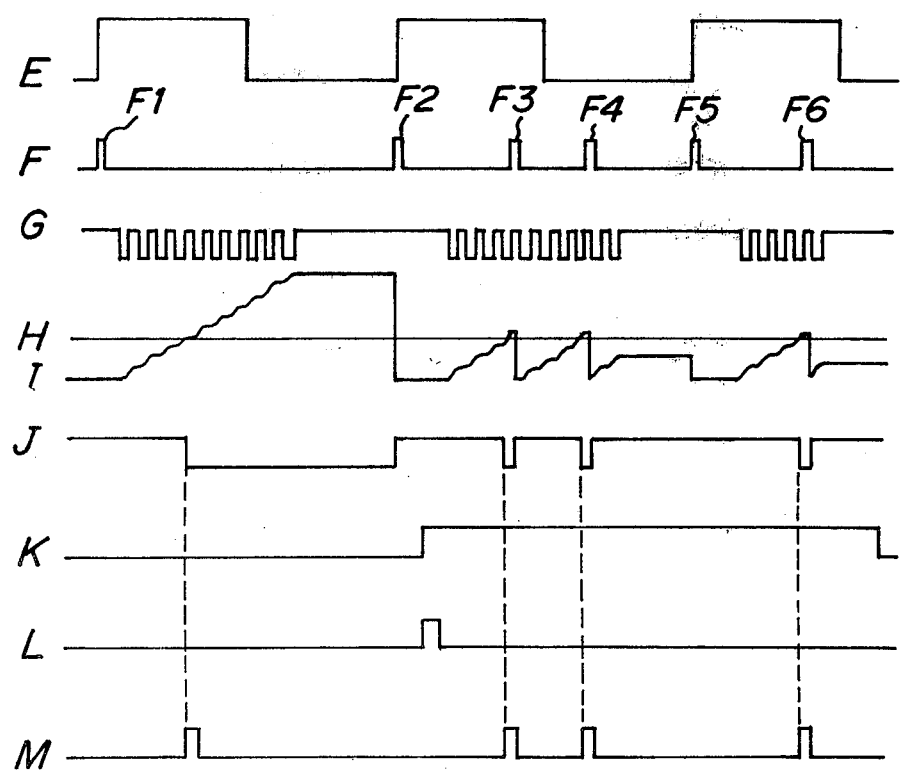

1

CONTROL DEVICE FOR AN INTERNAL COMBUSTION ENGINE

BACKGROUND OF THE INVENTION

The present invention relates to a control device for an internal combustion engine for detecting a knocking state produced in the engine and for feedback controlling an ignition timing, etc. of the engine in response to the knocking state.

It is known that a continuous and strong knocking state adversely affects the durability of an engine, but that a slight knocking state at relatively low engine speed ranges improve fuel consumption and output power characteristics of the engine. Further, it is known that the ignition timing is closely related to the occurrence of the knocking, in general the more the ignition timing is advanced the more knocking tends to occur.

Accordingly, a device has been proposed in which, in order to improve fuel consumption and output power characteristics of an engine, a knocking state produced in the engine is detected and the ignition timing is advanced and retarded in response to the detected knocking state so as to maintain a slight knocking state in the engine.

In such a known device, however, it takes a certain time to actually control the ignition timing in response to the detected knocking state, because the feedback control system thereof has a certain delay time in its response characteristic, so that only for a knocking state changing more slowly than the delay time can the ignition timing be smoothly controlled at an optimum timing.

In a transitional driving condition in which the driving condition of the engine is suddenly changed, the knocking state is also suddenly changed accordingly. However, due to the delay time the ignition timing cannot be controlled as quickly as desired in response to the sudden change of the knocking state. Under such transitional driving conditions optimum control of the ignition timing can not be obtained by conventional devices.

Since the knocking state tends to be enhanced in the transitional driving condition, more particularly during accelerating conditions, the ignition timing should be retarded as quickly as possible. However, in known devices, in order to stabilize the control or to prevent hunting, the ignition timing is retarded by a predetermined amount at a predetermined engine speed and therefore cannot be retarded quickly by the required amount. Therefore, the ignition timing cannot be controlled in an optimum manner by conventional devices, particularly during rapid acceleration conditions.

Therefore, during rapid acceleration condition the firing condition and hence fuel consumption and output power characteristics of the engine deteriorates.

SUMMARY OF THE INVENTION

An object of the invention is to provide an improved control device for an internal combustion engine in which the firing condition can be controlled in an optimum manner during transitional driving conditions, more particularly during rapid acceleration conditions.

According to the present invention, there is provided a control device for an internal combustion engine comprising a sensor for detecting pressure variations in a combustion chamber of the engine or vibrations resulting from the pressure variations and a detecting means for detecting the knocking state produced in the engine from the output signal of the sensor the control device further comprises an operating and controlling means which generates a control signal in response to the knocking detection signal from the knocking detection and which also feedback controls, in response to the said control signal, at least one of ignition timing, exhaust gas recirculation flow rate, fuel injection amount and fuel injection timing as control variables. In addition, the control device includes a device for detecting a transitional driving condition of the engine, such as, for example, an acceleration condition and means for varying the gain factor of said feedback control in response to the detection signal from the transitional driving condition detector.

BRIEF DESCRIPTION OF THE DRAWINGS

FIG. 1 is a block diagram illustrating an embodiment of the invention;

FIG. 2 and FIG. 3 are timing charts illustrating the operation of the embodiment of FIG. 1;

DETAILED DESCRIPTION OF THE PREFERRED EMBODIMENTS

Figure 4:
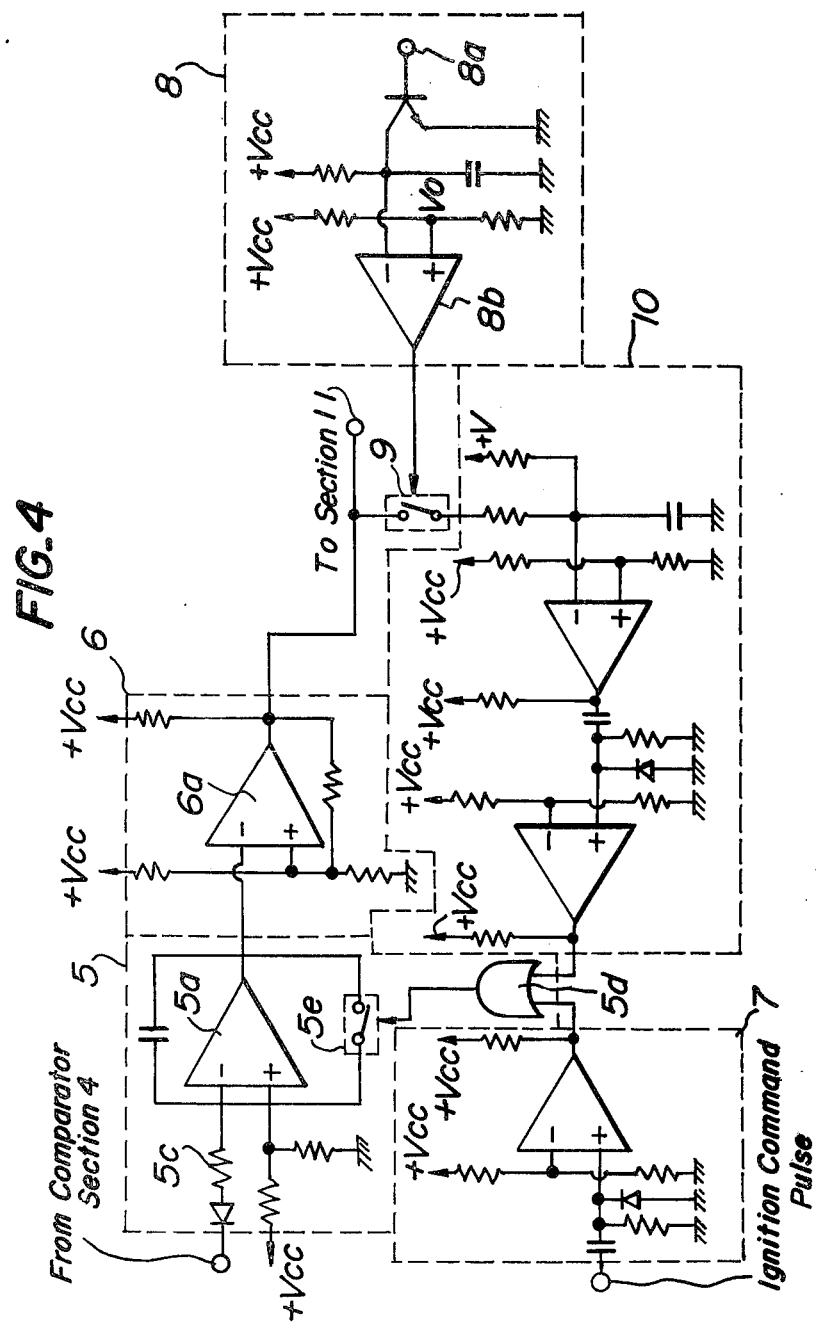
FIG. 4 is a detailed circuit diagram of an essential portion of the embodiment of FIG. 1.

FIG. 1 shows a block diagram of one embodiment according to the invention.

It is known that when the knocking occurs in the engine, the pressure in the combustion chamber varies and a pressure variation component having a particular frequency therein increases, which may be used to detect the occurrence of the knocking. A vibration sensor 1 makes use of this fact and detects the pressure variation in the combustion chamber or various vibrations caused by the pressure variation such as a vibration of the engine body, an acoustic wave produced by the engine body and the like and converts it to an electric signal.

Since the output signal of the sensor 1 includes various frequency components unrelated to the knocking, the output signal of the sensor 1 must be passed through a bandpass filter whose resonance frequency corresponds to said particular frequency to select the particular frequency component caused by the knocking.

The sensor 1 may consist of a resonance type vibration sensor whose resonance frequency corresponds to said particular frequency. In this case, the sensor 1 itself has a selecting or filtering function so that the bandpass filter is not required.

Such a resonance type sensor 1 produces an output signal which increases in amplitude, when the knocking occurs in the engine, as shown in FIG. 2A.

A signal treating section 2 halfwave-rectifies the output signal of the sensor 1 to produce a signal as shown in FIG. 2C.

A smoothing section 3 smoothes the output signal of the signal treating section 2 and amplifies the smoothed signal to a predetermined level to produce a reference signal as shown in FIG. 2B, which is used to obtain a signal representing the strength of the knocking as follows.

A comparator section 4 compares the output signal of the signal treating section 2 with the output signal of the smoothing section 3 and produces an output signal as shown in FIG. 2D which becomes low each time the former signal exceeds the latter signal.

The number of pulses in a sequence of negative pulses included in the output signal as shown in FIG. 2D as well as width of individual pulses thereof increase with increasing the strength of the knocking so that an integrated value of the sequence of negative pulses is in proportion to the strength of the knocking and thus from this integrated value the knocking state can be detected.

An integrator section 5 integrates the negative pulse sequence (FIG. 3G) from the comparator section 4 and a comparator section 6 compares the integrated value (FIG. 3I) from the integrator section 4 with a predetermined level (FIG. 3H) to detect the occurrence of the significant knocking.

The integrated value (FIG. 3I) of the integrator section 5 is reset at each time of ignition by reset pulses ($F_1$, $F_2$, $F_5$ in FIG. 3F) which are generated in a differential circuit 7 at leading edge of the ignition command pulses (FIG. 3E) synchronized with the rotation of crank shaft. In addition to the above-mentioned resetting, during the accelerating condition of the engine, the integrated value is also reset by reset pulses which generated in a differential circuit 10 at leading edge of the negative pulses (FIG. 3J) supplied from the comparator section 6 through a switch circuit 9 which is closed by an output signal (FIG. 3K) of an acceleration detector section 8.

FIG. 4 shows a detailed circuit diagram of the integrator section 5, the comparator section 6, the differential circuit 7, the acceleration detector section, the switch circuit 9 and the differential circuit 10.

The integrator section 5 comprises an integrator circuit comprising an operational amplifier 5a, a capacitor 5b and a resistor 5c, etc., in which the negative pulse sequence (FIG. 3G) from the comparator section 4 is integrated with a given integration rate determined by the values of the capacitor 5a and the resistor 5b, as shown in FIG. 3I. Then, a switch circuit 5e in the section 5 is closed by each reset pulse (FIG. 3F) supplied through OR circuit 5d to shortcircuit the capacitor 5b and to reset said integrated value (FIG. 3I).

The comparator section 6 comprises a comparator formed by an operational amplifier 6a, etc. which compared said integrated value (FIG. 3I) with a predetermined level (FIG. 3H) to produce an output signal (FIG. 3J) which becomes low when the former signal exceeds the latter signal and indicates to the occurrence of the significant knocking.

The acceleration detector section 8 comprises an acceleration sensor 8a, which detects the variation rate of the engine intake negative pressure or the opening degree of the throttle valve and produces a high level signal (FIG. 3L) when said variation rate exceeds a predetermined value, and a monostable circuit formed by an operational amplifier 8b, etc. Thus, this detector section produces an output signal having a predetermined width as shown in FIG. 3K as an acceleration detection signal upon accelerating an engine.

Figure 5:
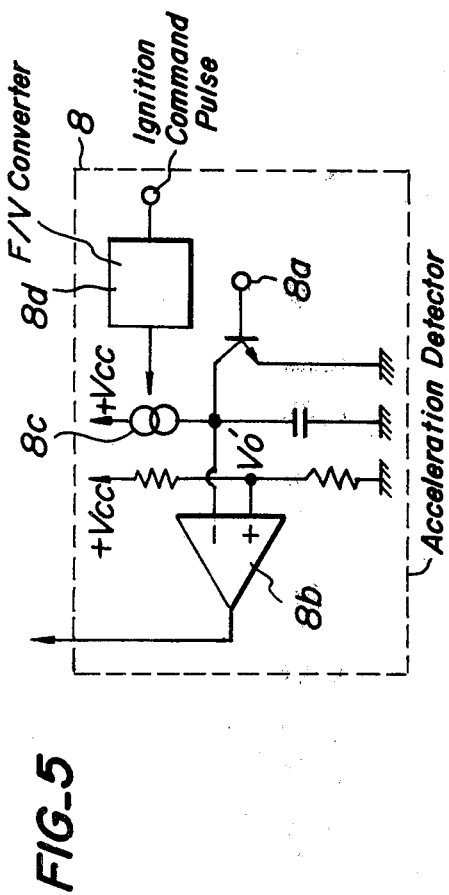
FIG. 5 is a circuit diagram of an another embodiment of the acceleration detector section in FIG. 1.

Alternately, as shown in FIG. 5 the acceleration detector section 8 may be further provided with a voltage-controlled constant current circuit 8c and a circuit for converting the frequency of the ignition command pulses to an equivalent voltage, the output voltage of which circuit controls the voltage-controlled constant current circuit 8c in such manner that the acceleration detection pulse is decreased in its width with increasing the engine rotation speed and the resultant pulse width, calculated in terms of crank angle, is always constant value corresponding to for example more or less larger than two rotations of the crank.

This acceleration detection pulse closes the switch circuit 9. During the switch circuit 9 is closed, each time the integrated value (FIG. 3I) from the integrator section 5 exceeds the predetermined level (FIG. 3H) and the output of the comparator section 6 becomes low, the differential circuit 10 generates a reset pulse as shown in FIG. 3F by $F_3$, $F_4$ which resets said integrated value as shown in FIG. 3I. That is, the differential circuit 10 generates a reset pulse as shown in FIG. 3 at $F_3$, when the integrated value of the integrator section 5 integrating the negative pulse sequence from the comparator section 4 exceeds the predetermined level (FIG. 3H), and resets the integrated value, after which the differential circuit 10 again generates a reset pulse as shown in FIG. 3 at $F_4$, when the subsequent integrated value of the integrator section 5 again exceeds the predetermined level, and resets the integrated value.

Thus, during the accelerating condition in which the acceleration detection pulse is generated, if a strong knocking occurs, which causes the comparator section 4 to produce a sequence of negative pulses the integrated value of which is at least two times larger than the predetermined level, the comparator section 6 produces at least two negative pulses.

An operating and controlling section 11 feedback controls at least one of an ignition timing, a flow rate of exhaust gas recirculating to the combustion chamber for reducing NOx product creation, a fuel injection amount and a fuel injection timing, etc. in response to the signal from the comparator section 6 so as to maintain the firing condition at an optimum condition.

In an example of the section 11 which controls only the ignition timing, an ignition retardation pulse having a predetermined width is generated in response to the negative pulse from the comparator 6 at its leading edge and the first next ignition angle position thereafter is retarded relative to the preceding ignition angle position by a predetermined angle in response to the ignition retardation pulse.

On the other hand, if no ignition retardation pulse is generated, ignition angle position is advanced relative to the preceding ignition angle position by a predetermined angle.

Thus, the ignition angle positions are successively advanced until the knocking occurs, at which time next ignition angle position is retarded, so that the ignition timing is feedback controlled at a point near the threshold of producing the knocking (that is a slight knocking state), as a result of which fuel consumption and output power characteristics are improved.

In the normal condition except the acceleration condition, one retardation pulse is generated at each ignition during the knocking occurs, so that the retardation angle of the next ignition relative to the preceding ignition is always constant.

In the accelerating condition in which a strong knocking tends to occur, such a constant ignition retardation angle control is insufficient to prevent a strong knocking.

In the above-mentioned embodiment according to the invention, when a strong knocking occurs in the accelerating condition, a plurality of the ignition retardation pulses are produced according to the strength of the knocking so that the ignition timing is controlled with a retardation angle which is several times larger than in the normal condition, that is to say the feedback control signal which determines an amount of the retardation angle obtained by the feedback control is amplified by several times than in the normal condition. As a result of this, even in the accelerating condition the strong knocking is sufficiently prevented and the firing condition is maintained in optimum.

Figure 6:
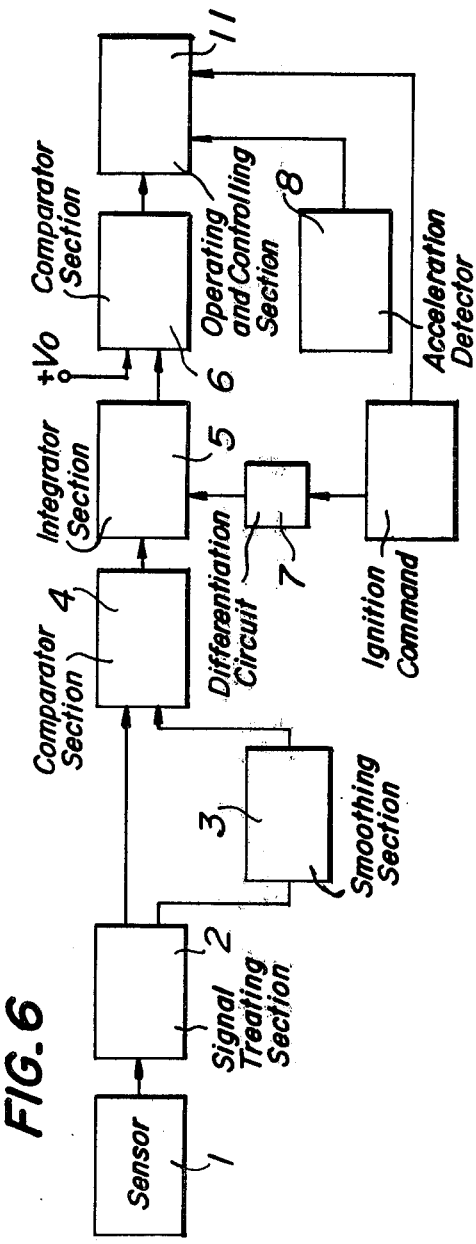
FIG. 6 is a block diagram illustrating an another embodiment of the invention.

FIG. 6 is a block diagram illustrating an another embodiment of the invention. This embodiment is same in construction as that of FIG. 1 except that the integrated value of the integrator section 5 is reset in response to only the ignition command pulse and the signal produced in the operating and controlling section 11 is modulated by the acceleration detection pulse from the acceleration detector section 8.

Figure 7:
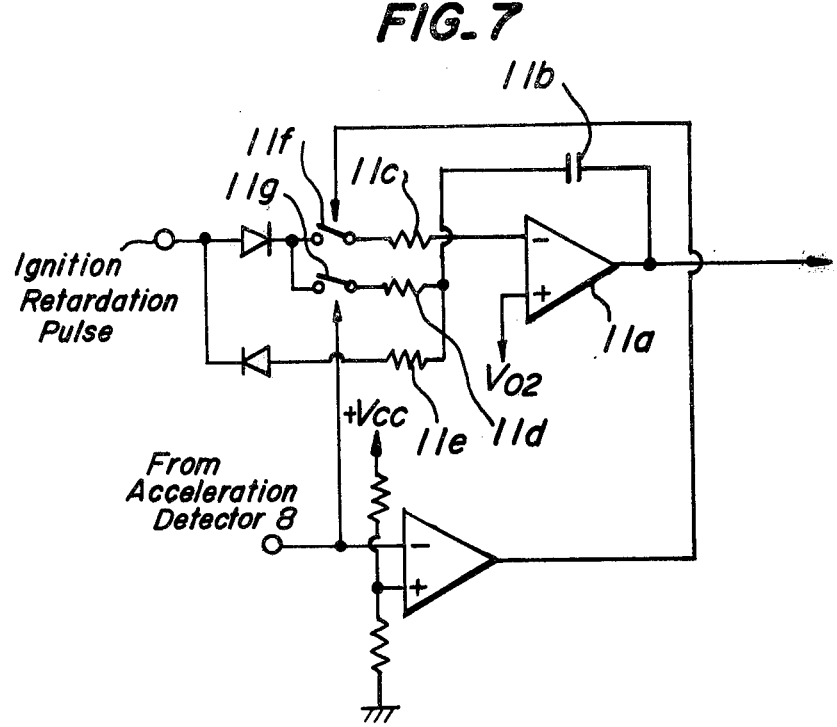
FIG. 7 is a detailed circuit diagram of the operating portion of the operating and controlling section in FIG. 6.
Figure 8:
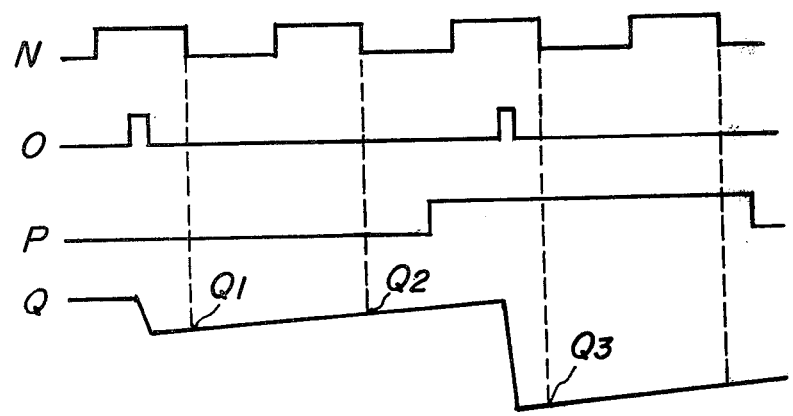
FIG. 8 is a timing chart illustrating the operation of the embodiment of FIG. 6.

The operating portion in the operating and controlling section 11 is, as shown in FIG. 7, a kind of charging and discharging circuit comprising an operational amplifier 11a, a capacitor 11b, resistors 11c, 11d, 11e and switch circuits 11f, 11g, etc., which circuit in the normal condition produces as a feedback signal a voltage signal as shown in FIG. 8Q which decreases at a predetermined rate upon receiving the ignition retardation pulse (FIG. 8O) and then increases gradually at a predetermined rate lower than said decreasing rate.

The decreasing rate of this voltage signal is determined by the values of the capacitor 11b and the resistor 11c, while the increasing rate thereof is determined by the values of the capacitor 11b and the resistor 11e.

In the accelerating condition, the switch 11g is closed and the switch 11f is opened in response to the acceleration detection pulse (FIG. 8P) from the acceleration detector section 8, which causes the decreasing rate of the voltage decrease produced by the ignition retardation pulse to be higher than that of the voltage decrease in the normal condition.

This decreasing rate is determined by the value of the capacitor 11b and the resistors 11d and 11e. The values of these resistors are so selected that the decreasing rate in the accelerating condition becomes higher than that in the normal condition.

The control portion of the section 11 advances or retards the ignition timing in proportion to the output voltage value ($Q_1$, $Q_2$, $Q_3$ in FIG. 8Q) at each trailing edge of the ignition command pulses (FIG. 8N) synchronized with the crank shaft rotation.

That is to say, as shown in FIG. 8Q, since the voltage drop caused by the retardation pulse (FIG. 8O) causes the same voltage drop to the voltage value $Q_1$ immediately after the occurrence of the knocking, the first ignition immediately after the occurrence of the knocking is retarded relative to the preceding ignition before the occurrence of the knocking by an angle corresponding to said voltage drop, after which since there is no knocking, the voltage as shown in FIG. 8Q increases and the next ignition is advanced relative to the preceding ignition by an angle corresponding to the voltage increase from value $Q_1$ to $Q_2$.

If a strong knocking occurs during the accelerating condition, the decreasing rate of the voltage decrease produced in the output voltage of said operating portion by the ignition retarding pulse (FIG. 8O) becomes much higher than in the normal condition, which causes a larger voltage drop than in the normal condition to the voltage value $Q_3$ immediately after the occurrence of the knocking.

Accordingly, in the accelerating condition the first ignition immediately after the knocking is retarded relative to the preceding ignition by a larger angle corresponding to said larger voltage drop than in the normal condition.

Thus, the feedback control signal which determines an amount of the ignition retardation angle obtained by the feedback control is more amplified in the accelerating condition than in the normal condition, so that even in the accelerating condition a strong knocking can be avoided and the firing condition can be maintained in optimum as in the embodiment of FIG. 1.

While, instead of the ignition timing or in addition to the ignition timing, an exhaust gas recirculation flow rate, a fuel injection amount, a fuel injection timing or the like can be feedback controlled in response to the detected knocking state in such manner that a strong knocking is avoided.

As explained hereinbefore, according to the invention, even in the accelerating condition the firing condition can be feedback controlled in optimum manner to improve the fuel consumption and output power characteristics.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A control device for an internal combustion engine comprising:
   a sensor for detecting pressure variations in a combustion chamber of the engine or vibrations resulting from the pressure variations;
   first detecting means for detecting a knocking state produced in the engine from the output signal of said sensor and for producing a knocking detection pulse signal;
   operating and controlling means for generating a control signal in response to the knocking detection signal from said first detecting means and for feedback controlling, in response to said control signal, at least one of ignition timing, exhaust gas recirculation flow rate, fuel injection amount and fuel injection timing as control variables, said operating and controlling means further being operable to generate a voltage signal which decreases in amplitude at a predetermined rate in response to said knocking detection pulse signal and then gradually increases at a predetermined rate lower than said decreasing rate and controls at least one of said control variables in proportion to the value of said voltage signal at trailing edge of an ignition command pulse synchronized with the rotation of the crank shaft;

second detecting means for detecting a transitional driving condition of the engine; and means for varying the gain factor of said feedback control in response to the detection signal from said second detecting means.

2. A control device as claimed in claim 1, wherein said means for varying the gain factor is operable to control said operating and controlling means in response to the output signal from said second detecting means whereby, in the knocking condition, the voltage decrease in amplitude produced in said voltage signal in response to the knocking detection signal is made larger.

3. A control device for an internal combustion engine comprising:

a sensor for detecting pressure variations in a combustion chamber of the engine or vibrations resulting from the pressure variations;

first detecting means for detecting a knocking state produced in the engine from the output signal of said sensor and for producing a knocking detection pulse signal;

said first detecting means including a signal rectifying means for rectifying the output signal of said sensor, smoothing means for smoothing the rectified signal from said rectifying means to obtain a reference signal, a first comparing means for comparing said rectified signal and said reference signal to produce an output signal when the former signal exceeds the latter signal, integrating means which is reset in response to each ignition command pulse at its leading edge and integrates the output signal of said first comparing means, and a second comparing means for comparing the integrated signal from said integrating means and a predetermined reference value to produce said knocking detection pulse signal when said integrated signal exceeds said reference value;

operating and controlling means for generating a control signal in response to the knocking detection signal from said first detecting means and for feedback controlling, in response to said control signal, at least one of ignition timing, exhaust gas recirculation flow rate, fuel injection amount and fuel injection timing as control variables;

second detecting means for detecting a transitional driving condition of the engine; and means for varying the gain factor of said feedback control in response to the detection signal from said second detecting means.

4. A control device as claimed in claim 3, wherein said means for varying the gain factor comprises means for supplying the knocking detection pulse signal from said second comparing means to said integrating means as reset signal in response to the output signal of said second detecting means so that the number of the knocking detection pulse signals produced by said second comparing means is incrased during the transitional condition.

5. A control device as claimed in claim 1 or 3, wherein said operating and controlling means is operable to generate a pulse in response to each of said knocking detection pulse signals and to feedback control, in response to said pulse, at least one of said control variables by a predetermined amount.

6. A control device as claimed in claim 5, wherein said means for varying the gain factor is operable to control said first detecting means in response to the output signal from said second detecting means so that the number of the knocking detection pulses produced by said first detecting means is increased during the transitional condition.

7. A control device as claimed in claim 1 or 2 or 3 or 4, wherein said transitional driving condition is the accelerating condition of the engine and said gas factor is increased during the accelerating condition, whereby in the accelerating condition at least one of said control variables is feedback controlled more quickly so that the firing condition of the engine is maintained in optimum condition even in the accelerating condition.

8. A control device as claimed in claim 7, wherein said transitional driving condition detecting means comprises an acceleration detector which detects the accelerating condition of the engine based on a variation rate of intake negative pressure or throttle valve opening degree and generates a pulse having a predetermined constant width.

9. A control device as claimed in claim 7, wherein said transitional driving condition detecting means comprises an acceleration detector which detects the accelerating condition of the engine based on a variation rate of intake negative pressure or throttle valve opening degree and generates a pulse having a width which decreases with increasing the rotation speed of the engine.

* * * * *